(12) United States Patent
Verma et al.

(10) Patent No.: US 8,305,893 B2
(45) Date of Patent: Nov. 6, 2012

(54) QUALITY OF SERVICE MANAGEMENT FOR HOME-TO-HOME CONNECTIONS

(75) Inventors: Sanjeev Verma, San Jose, CA (US); Mahfuzur Rahman, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 299 days.

(21) Appl. No.: 12/534,721

(22) Filed: Aug. 3, 2009

(65) Prior Publication Data

US 2010/0232441 A1   Sep. 16, 2010

Related U.S. Application Data

(60) Provisional application No. 61/160,521, filed on Mar. 16, 2009.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. .................... 370/231; 370/252; 370/395.21; 370/401

(58) Field of Classification Search .................. 370/231, 370/252, 395.21, 401
See application file for complete search history.

(56) References Cited

U.S. PATENT DOCUMENTS

| | | | |
|---|---|---|---|
| 7,965,703 B2* | 6/2011 | Rieger .......................... | 370/352 |
| 2002/0026503 A1* | 2/2002 | Bendinelli et al. ............ | 709/220 |
| 2003/0199278 A1* | 10/2003 | Lee et al. ..................... | 455/452.2 |
| 2007/0211632 A1* | 9/2007 | Song et al. .................... | 370/230 |
| 2007/0286074 A1* | 12/2007 | Xu ................................ | 370/230 |
| 2008/0080534 A1* | 4/2008 | Lee et al. ...................... | 370/401 |
| 2008/0181117 A1* | 7/2008 | Acke et al. ................... | 370/236.2 |
| 2009/0304009 A1* | 12/2009 | Kolhi et al. .................. | 370/400 |
| 2010/0095002 A1* | 4/2010 | Viger et al. ................... | 709/226 |
| 2010/0191829 A1* | 7/2010 | Cagenius ...................... | 709/219 |

* cited by examiner

*Primary Examiner* — Alpus H Hsu
*Assistant Examiner* — Yee Lam
(74) *Attorney, Agent, or Firm* — Beyer Law Group LLP

(57) ABSTRACT

In a first embodiment of the present invention, a method of establishing end-to-end Quality of Service (QoS) is provided, the method comprising: receiving minimum QoS requirements for a connection between a local device in a local network and a remote device in a remote network; requesting that a QoS connection between the local device and a local gateway in the local network be established; computing remaining QoS requirements by deducting achieved QoS between the local device and the local gateway from the minimum QoS requirements; requesting that a QoS connection between the remote device and a remote gateway in the remote network be established, using the remaining QoS requirements; and requesting to configure a QoS connection between a local gateway and a remote gateway.

19 Claims, 7 Drawing Sheets

QUALITY OF SERVICE MANAGEMENT FOR HOME-TO-HOME CONNECTIONS

CROSS-RELATION TO RELATED APPLICATION

This application claims priority to provisional patent application Ser. No. 61/160,521, entitled "HOME NETWORK QUALITY-OF-SERVICE MANAGEMENT FOR HOME-TO-HOME CONNECTION", filed Mar. 16, 2009, herein incorporated by reference in its entirety.

BACKGROUND OF THE INVENTION

1. Field of the Invention

The present invention relates to computing. More particularly, the present invention relates to the application of Quality of Service to Home-to-Home network connections.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a stand-alone UI device such as a wireless PDA or tablet. In other cases, the home network user interface device could be more remote and communicate with the home network through a tunneling mechanism on the Internet.

In the field of computer networking and other packet-switched telecommunication networks, the traffic engineering term quality of service (QoS) refers to resource reservation control mechanisms. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications such as voice over IP, online games and IP-TV, since these often require fixed bit rate and are delay sensitive, and in networks where the capacity is a limited resource, for example in cellular data communication. In the absence of network congestion, QoS mechanisms are not required.

A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase.

The UPnP QoS Working Group has proposed a standardized middleware that provides real-time applications with a uniform interface to use QoS features of different Layer 2 or Layer 3 technologies in a heterogeneous home network. This approach, however, is a centralized approach, where a QoS request is sent to a centralized QoS manager that decomposes the end-to-end QoS requirements among device in the path and subsequently instructs devices in the path to reserve resource. While this solution works fine in home environments, where the size of the network is small and does not traverse great differences, it does not work as well where the network includes multiple homes spread across geographically-wide areas. The latencies involved in transmitting across such distances and the amount of traffic generated by the centralized QoS manager makes such a solution ineffective.

SUMMARY OF THE INVENTION

In a first embodiment of the present invention, a method of establishing end-to-end Quality of Service (QoS) is provided, the method comprising: receiving minimum QoS requirements for a connection between a local device in a local network and a remote device in a remote network; requesting that a QoS connection between the local device and a local gateway in the local network be established; computing remaining QoS requirements by deducting achieved QoS between the local device and the local gateway from the minimum QoS requirements; requesting that a QoS connection between the remote device and a remote gateway in the remote network be established, using the remaining QoS requirements; and requesting to configure a QoS connection between a local gateway and a remote gateway.

In a second embodiment of the present invention, a control point is provided in a local network, the control point comprising: memory; and a processor configured to: receive minimum QoS requirements for a connection between a local device in a local network and a remote device in a remote network; request that a QoS connection between the local device and a local gateway in the local network be established; compute remaining QoS requirements by deducting achieved QoS between the local device and the local gateway from the minimum QoS requirements; request that a QoS connection between the remote device and a remote gateway in the remote network be established, using the remaining QoS requirements; and request to configure a QoS connection between a local gateway and a remote gateway.

In a third embodiment of the present invention, a system for establishing end-to-end Quality of Service (QoS) is provided, the system comprising: a first network comprising: a first device; a control point; a first QoS manager; and a first gateway, wherein the first gateway includes a remote access server (RAS) service; a second network comprising: a second device; a second QoS manager; and a second gateway, wherein the second gateway includes a remote access server (RAS) service; wherein the first device is configured to request a QoS connection between the first device and the second device, with minimum QoS requirements; wherein the control point is configured to receive the request from the first device and to request that the first QoS manager establish a QoS connection between the first device and a first gateway; wherein the first QoS manager is configured to establish the QoS connection between the first device and the first gateway using the minimum QoS requirements, and to send confirmation to the control point including the achieved QoS; wherein the control point is further configured to compute remaining QoS requirements by deducting the achieved QoS from the minimum QoS requirements and to send a request to the first gateway that a QoS connection between the second device and a second gateway be established, wherein the request to the first gateway includes the remaining QoS requirements; wherein the first gateway is configured to forward the request that a QoS connection between the second device and the second gateway be established to the second gateway; wherein the second gateway is configured to forward the request that a QoS connection between the second device and the second gateway be established to the second QoS manager; wherein the second QoS manager is configured to establish the QoS connection between the second device and the second gateway using the remaining QoS requirements, and to send confirmation to the control point; wherein the control point is further configured to receive the confirmation from the second QoS manager that a QoS connection between the second device and the second gateway and to sending a request to the first gateway to configure a QoS connection between the first gateway and the second gateway; and wherein the first gateway is configured to request that a network service provider establish a QoS connection between the first gateway and the second gateway.

In a fourth embodiment of the present invention, a program storage device readable by a machine tangibly embodying a program of instructions executable by the machine to perform a method of establishing end-to-end Quality of Service (QoS) is provided, the method comprising: receiving minimum QoS requirements for a connection between a local device in a local network and a remote device in a remote network; requesting that a QoS connection between the local device and a local gateway in the local network be established; computing remaining QoS requirements by deducting achieved QoS between the local device and the local gateway from the minimum QoS requirements; requesting that a QoS connection between the remote device and a remote gateway in the remote network be established, using the remaining QoS requirements; requesting to configure a QoS connection between a local gateway and a remote gateway.

DETAILED DESCRIPTION OF SPECIFIC EMBODIMENTS

Figure 1:
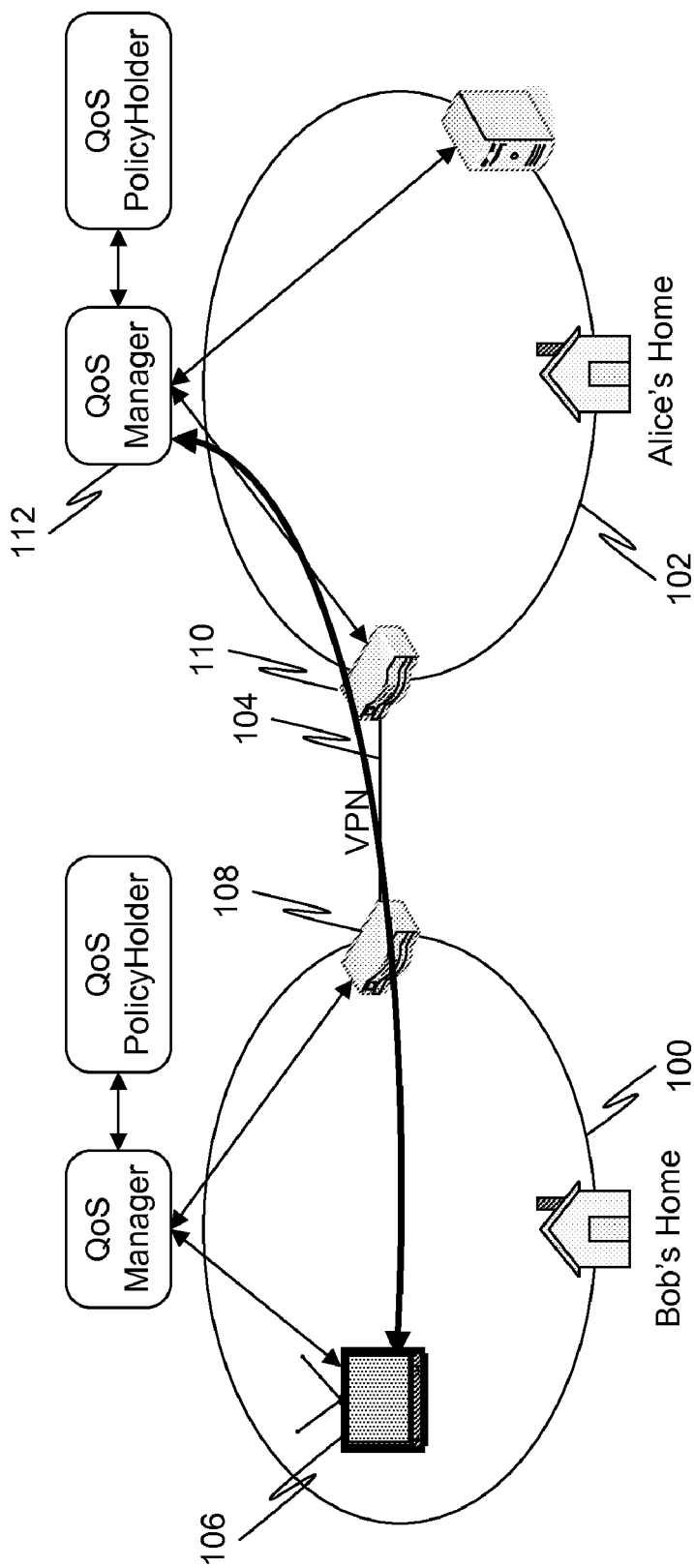
FIG. 1 is a diagram illustrating an end-to-end QoS connection between home networks in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

For purposes of this document, the term "control point" shall be interpreted to mean any client device in a home network. A "traffic specification" shall be interpreted to mean any indication of an application's requirements, preferences, or expectations regarding network traffic it plans on receiving and/or sending.

It should also be noted that, although steps in methods are described herein as occurring in a certain order, one of ordinary skill in the art will recognize that many of the steps can be rearranged such that, absent an express requirement that a particular step be performed prior to another particular step, nothing in the descriptions or claims below shall be taken to require a certain order for the steps.

In an embodiment of the present invention, QoS is guaranteed between geographically separated home networks such as UPnP networks in different states without using a centralized QoS manager.

FIG. 1 is a diagram illustrating an end-to-end QoS connection between home networks in accordance with an embodiment of the present invention. There are two home networks depicted, one in Bob's home 100, and one in Alice's home 102. The entire end-to-end connection can then be thought of as comprising 3 segments: (1) Bob's home network 100, (2) the connection between Bob's home network and Alice's home network 104, and (3) Alice's home network 102. As will be seen, by treating the end-to-end connection as three separate segments, it becomes possible to establish QoS across the entire connection without using a centralized QoS manager.

In one embodiment of the present invention, it is assumed that a remote access connection has already been set up between the two home networks and that a virtual private network (VPN) between them has already been configured. It is also assumed that security credentials have been set up using, for example, UPnP Remote Access (RA) mechanisms in order to allow certain home networking services to be available in the home networks.

Figure 2:
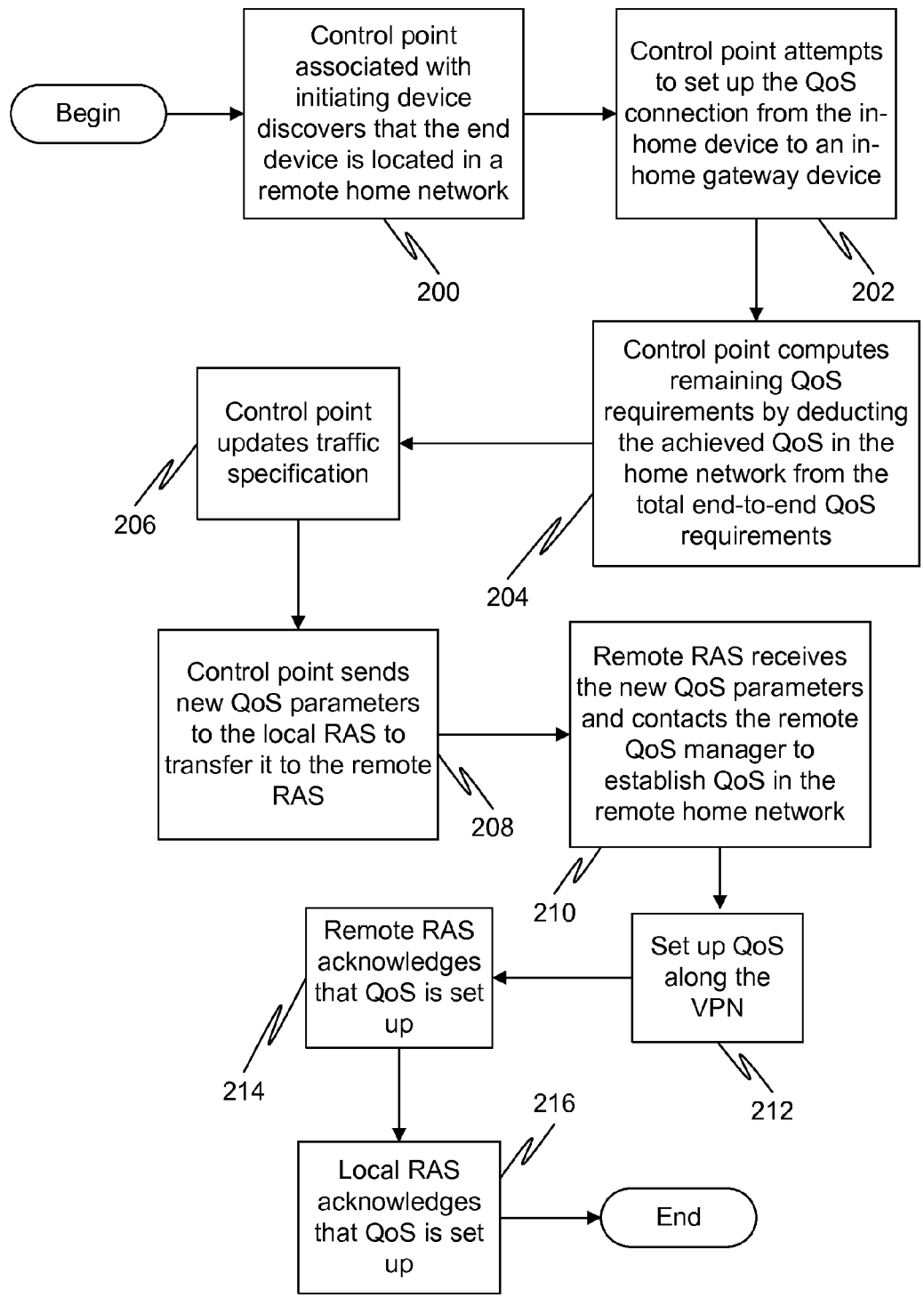
FIG. 2 is a flow diagram illustrating a method for establishing QoS between two home networks in accordance with an embodiment of the present invention.

FIG. 2 is a flow diagram illustrating a method for establishing QoS between two home networks in accordance with an embodiment of the present invention. At 200, a control point associated with the initiating device discovers that the end device is located in a remote home network. The initiating device is the device in a first home network that is requesting that QoS be established. It may be, for example, the device that is requesting some service from an end device. However, in some embodiments, it is the end device that is requesting the service from the initiating device and the initiating device is merely acting as the lead on setting up the QoS between the two devices. The information that the end device is located in a remote home network is obtained from a remote access service (RAS) located in the first home network by invoking a UPnP action on the EAS. In order to support this action, the RAS implements a service that exposes the interface for the action. In an alternative embodiment, the control point may discover that the remote home network has a QoS Manager Service. In yet another alternative embodiment, no action is invoked and the system simply determines whether a device is local or remote based upon the IP addresses of the devices. In such embodiments, therefore, step 200 is not mandatory.

At 202, the control point first tries to set up the QoS connection from the in-home device to an in-home gateway device, which may also include a RAS. The control point gets the best possible QoS in the home network based on a traffic specification of the application that needs the bandwidth. The QoS connection between the initiating device and the in-home gateway may be set up using existing UPnP QoSv3 mechanisms. This includes setting up the QoS at the RAS, which may include a QoS device.

Figure 3:
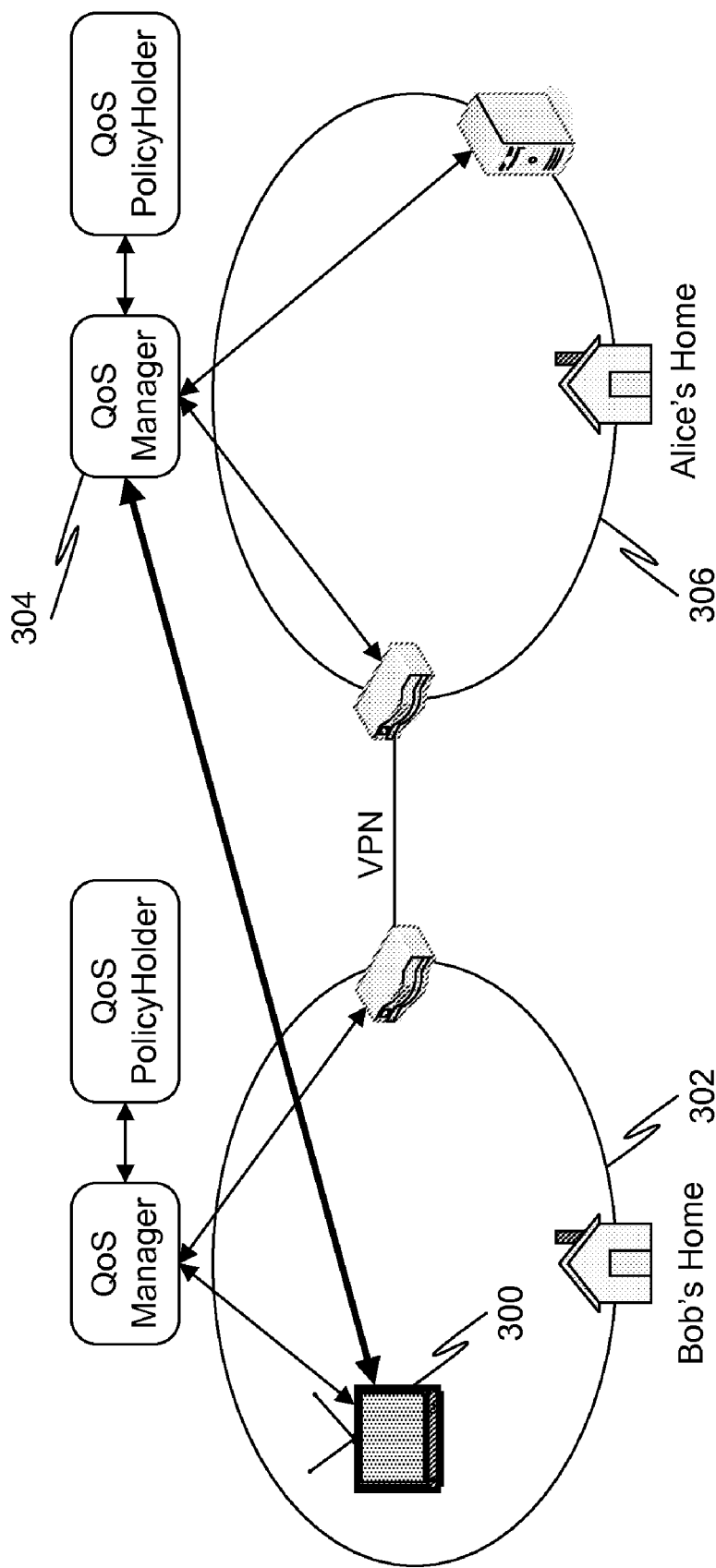
FIG. 3 is a flow diagram illustrating a method of establishing end-to-end QoS in accordance with an embodiment of the present invention.

At 204, the control point then computes the remaining QoS requirements by deducting the achieved QoS in the home network from the total end-to-end QoS requirements. At 206, the traffic specification may then be updated accordingly. At 208, the control point sends the new QoS parameters to the local RAS to transfer it to the remote RAS. At 210, the remote RAS receives the new QoS parameters and contacts the QoS Manager in that home network to establish QoS in the remote home network. This is the embodiment depicted in FIG. 1, with the request from the control point 106 passing through the local gateway/RAS 108 and the remote gateway/RAS 110 before reaching the remote QoS manager 112. FIG. 3 depicts an alternative embodiment, wherein, steps 204-210 in FIG. 2 are replaced with the control point 300 in the local home 302 sending a fresh direct request to the QoS Manager Service 304 in the remote home network 306 to set up QoS in the remote home network. If Session Initiation Protocol (SIP) is used in the system, this may be accomplished by using a SIP INVITE message, where the body of the SIP INVITE message contains all QoS related parameters. The SIP INVITE message may also be used to carry credentials and other parameters to establish a second tunnel between the local RAS and the remote RAS for the new traffic for which the QoS is being established.

At 212, QoS along the VPN is set up by either the local QoS manager or the remote QoS manager (or both, depending upon whether the traffic is unidirectional or bidirectional). This may involve reserving resources along the wide area network (EAN) interface of the gateway device.

At 214, the fact that the QoS is set up is acknowledged by the remote RAS to the local RAS. This may be accomplished, for example, by using a SIP message, sending a UPnP event or invoking a UPnP action on the local RAS.

At 216, the local RAS acknowledges the end-to-end QoS to the local control point by sending a UPnP action or by invoking an action to the CP.

Thus, the basic approach is to split a WoS request into two parts—one request for local QoS set up and a second request for remote QoS set up. The QoS set up then comprises the following basic steps: (1) discovery of the remote device and corresponding QoS manager service through enhanced RA services; (2) attempt to get the best possible local QoS set up using UPnP QoSv3 services; (3) recalculate the QoS budget for the remote home network and send a QoS set up request to the QoS manager service in the remote home network; and (4) achieve a QoS set up once the initiating control point gets a success message from both the local QoS manager service and the remote QoS manager services.

It should be noted that the use of SIP is not necessary. In an alternative embodiment to FIG. 2 above, UPnP QoS mechanisms can be used to communicate between two RASes. Each RAS may include an embedded control point feature. The control point in the local home may contact the QoS manager in the local home to set up QoS. The control point may specify the boundary of the request as the address of the local RAS and the destination as the remote device in the remote home with which the control point wants to set up QoS. The QoS device in the local RAS may then get a QoS request from the QoS Manager of the local home. The QoS device in the RAS may have the RAS-specific control point feature enabled upon it and it can take this request and invoke a Simple Object Access Protocol (SOAP) action on the QoS device in the remote RAS. Then the remote access control point in the QoS device in the remote RAS can contact the QOS manager of the remote home to establish QoS in the remote home. In order to enable this embodiment, the QOS device in the remote home can be exposed through a Remote Access mechanism to the RAS in the local home. No other QoS devices or QoS managers in the remote home, however, need to be exposed.

Figure 4:
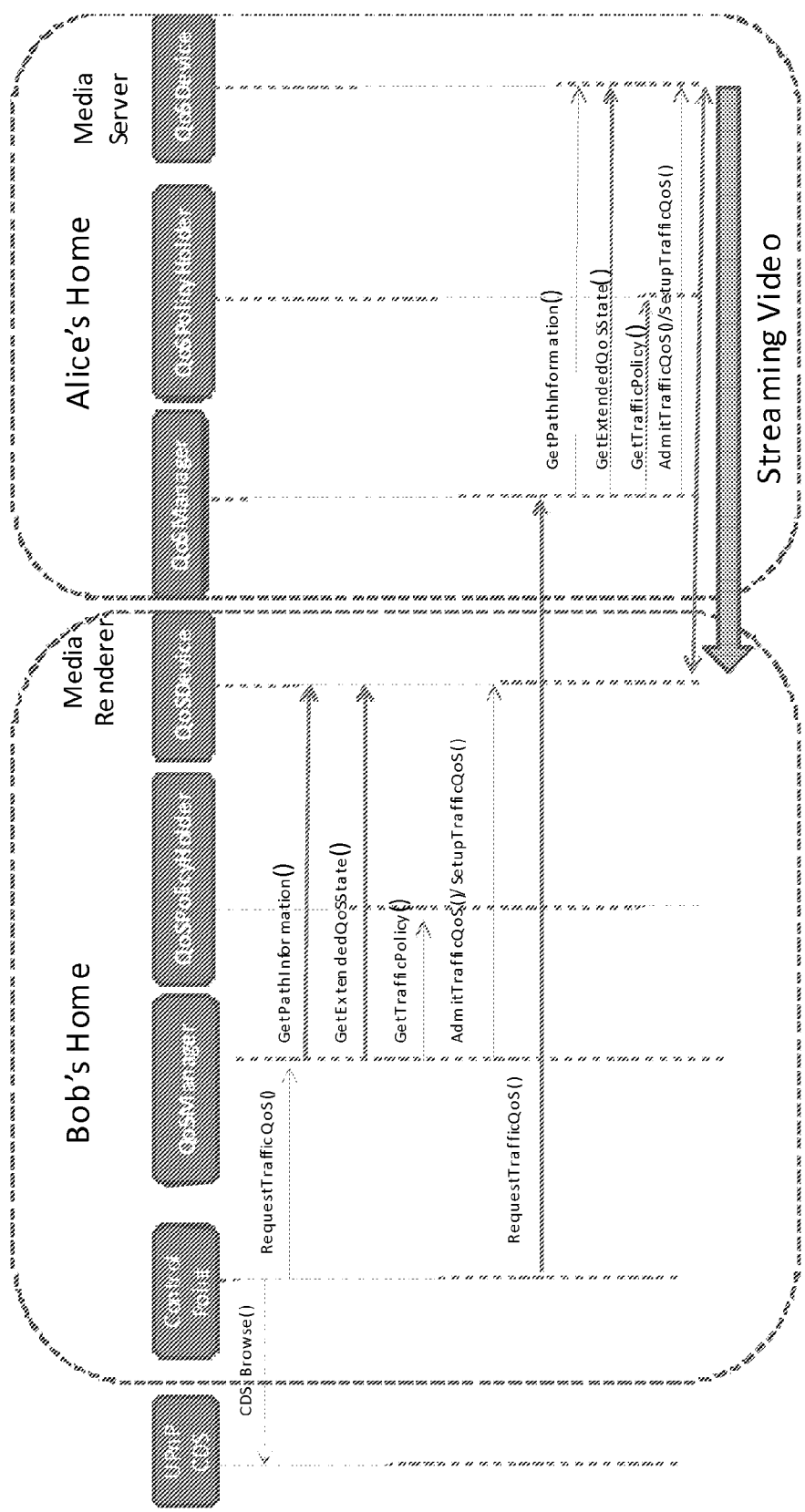
FIG. 4 is a flow diagram illustrating a method of establishing end-to-end QoS in accordance with another embodiment of the present invention.

FIG. 4 is a Signaling diagram illustrating an embodiment of the method described above with respect to setting up a QoS connection between homes to stream video from Alice's home to Bob's home.

Figure 5:
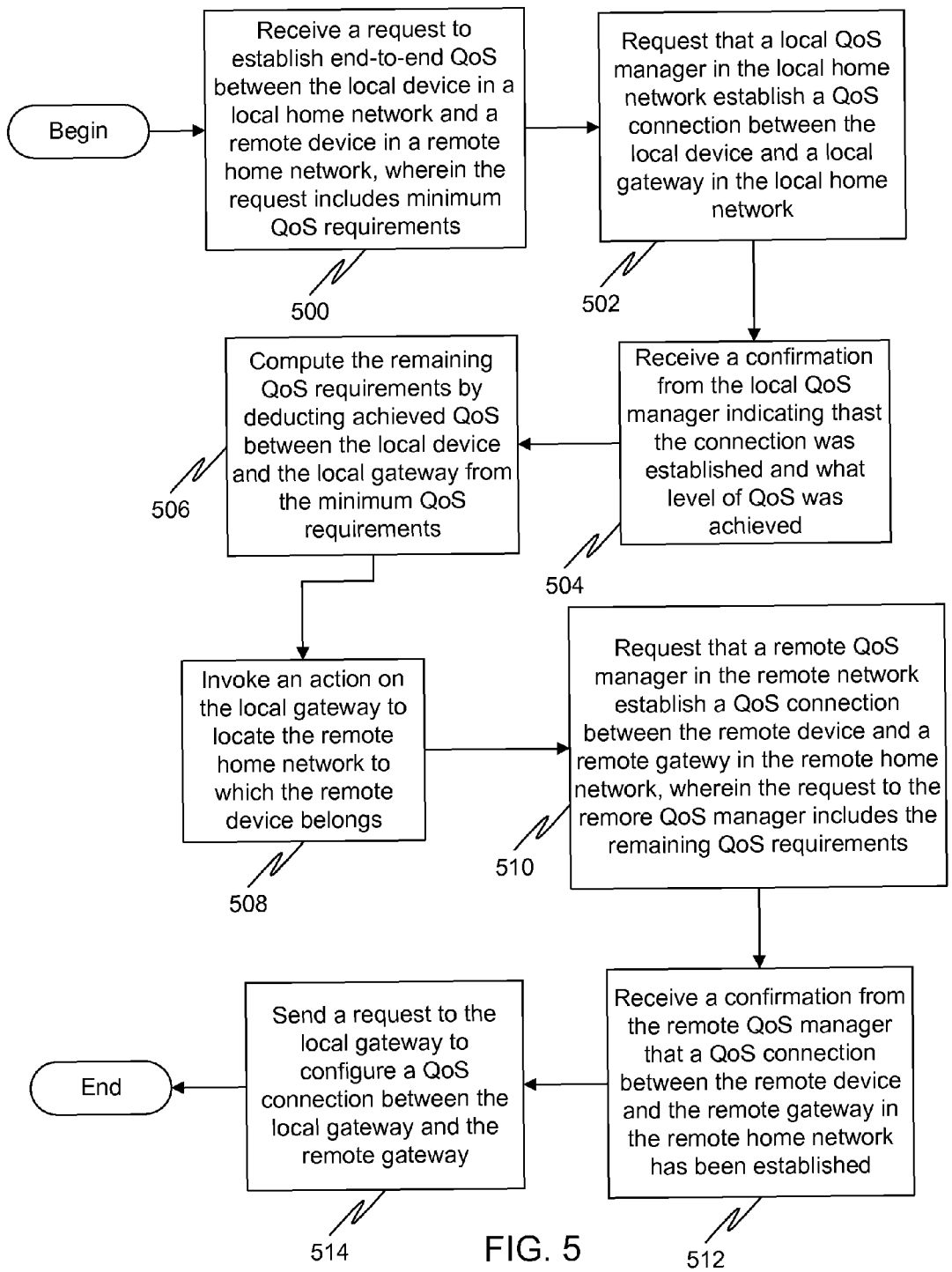
FIG. 5 is a flow diagram illustrating a control point in accordance with an embodiment of the present invention.

FIG. 5 is a flow diagram illustrating a method of establishing end-to-end QoS in accordance with an embodiment of the present invention. Each step of this method may be performed by a control point in a local home network, wherein the control point is associated with a first device. At 500, a request to establish end-to-end QoS between a local device in a local home network and a remote device in a remote home network is received, wherein the request includes minimum QoS requirements. The QoS requirements may be in the form of, for example, a traffic specification or a traffic descriptor. The request may have been generated by, for example, an application operating on the first device.

At 502, the control point requests that a local QoS manager in the local home network establish a QoS connection between the local device and a local gateway in the local home network. At 504, a confirmation is received from the local QoS manager indicating that the connection was established and what level of QoS was achieved. At 506, the control point computes the remaining QoS requirements by deducting achieved QoS between the local device and the local gateway from the minimum QoS requirements. At 508, the control point may invoke an action on the local gateway to locate the remote home network to which the remote device belongs. At 510, the control point requests that a remote QoS manager in the remote network establish a QoS connection between the remote device and a remote gateway in the remote home network, wherein the request to the remote QoS manager includes the remaining QoS requirements. This may be performed over, for example, SIP or HTTP.

At 512, a confirmation is received from the remote QoS manager that a QoS connection between the remote device and the remote gateway in the remote home network has been established. At 514, a request is sent to the local gateway to configure a QoS connection between the local gateway and the remote gateway. This might include the local gateway requesting that a network provider of the network between the local gateway and the remote gateway either update a pre-existing QoS connection or establish a new one.

Figure 6:
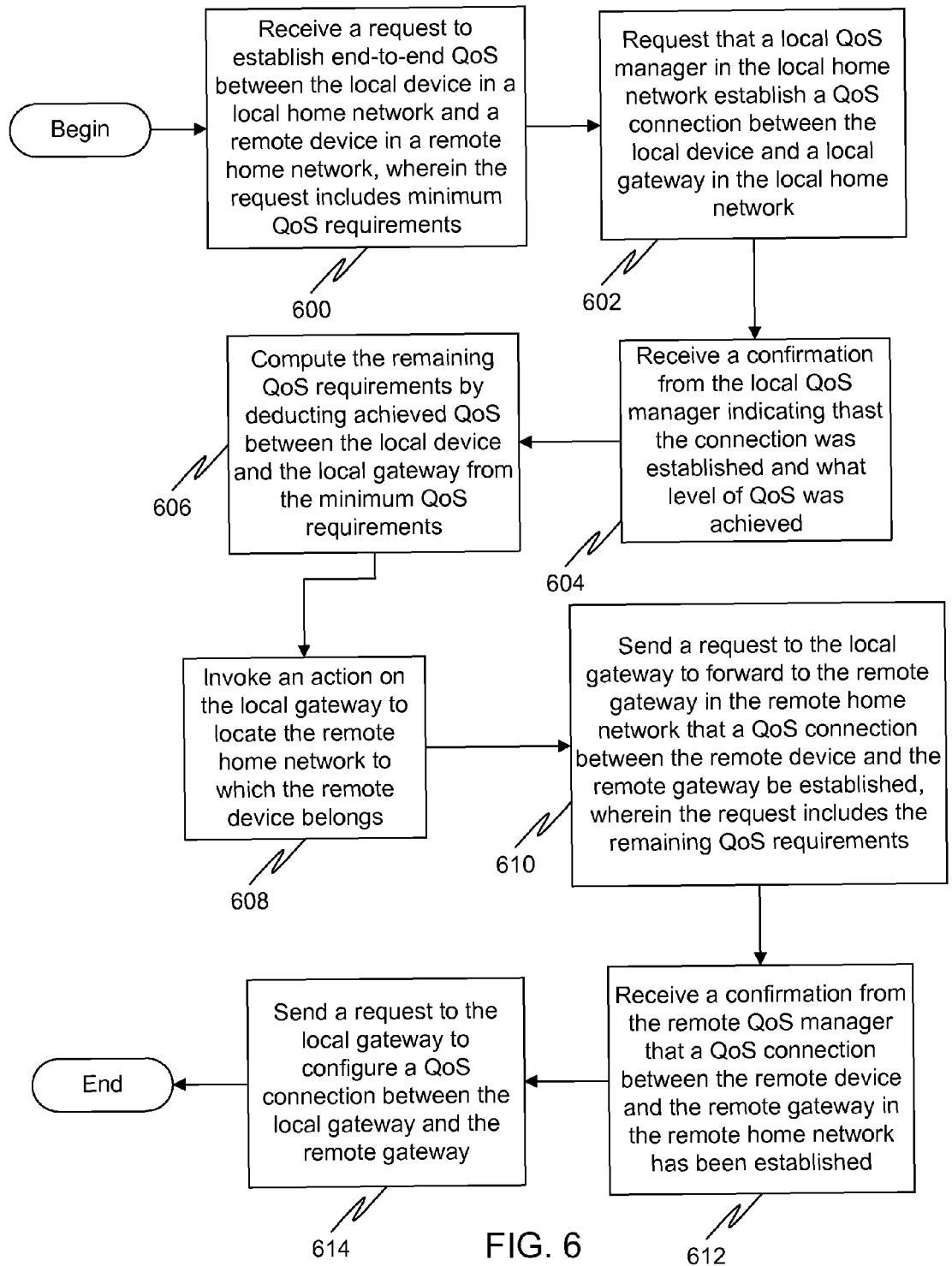
FIG. 6 is a flow diagram illustrating a method of establishing end-to-end QoS in accordance with another embodiment of the present invention.

FIG. 6 is a flow diagram illustrating a method of establishing end-to-end QoS in accordance with another embodiment of the present invention. Each step of this method may be performed by a control point in a local home network. At 600, a request to establish end-to-end QoS between a local device in a local home network and a remote device in a remote home network is received, wherein the request includes minimum QoS requirements. The QoS requirements may be in the form of, for example, a traffic specification or a traffic descriptor. The request may have been generated by, for example, an application operating on the first device.

At 602, the control point requests that a local QoS manager in the local home network establish a QoS connection between the local device and a local gateway in the local home network. At 604, a confirmation is received from the local QoS manager indicating that the connection was established and what level of QoS was achieved. At 606, the control point computes the remaining QoS requirements by deducting achieved QoS between the local device and the local gateway from the minimum QoS requirements. At 608, the control point may invoke an action on the local gateway to locate the remote home network to which the remote device belongs. At 610, the control point sends a request to the local gateway to forward to a remote gateway in the remote home network that a QoS connection between the remote device and the remote gateway be established, wherein the request to the local gateway includes the remaining QoS requirements.

At 612, a confirmation is received from the remote QoS manager that a QoS connection between the remote device and the remote gateway in the remote home network has been established. At 614, a request is sent to the local gateway to configure a QoS connection between the local gateway and the remote gateway. This might include the local gateway requesting that a network provider of the network between the local gateway and the remote gateway either update a pre-existing QoS connection or establish a new one.

Figure 7:
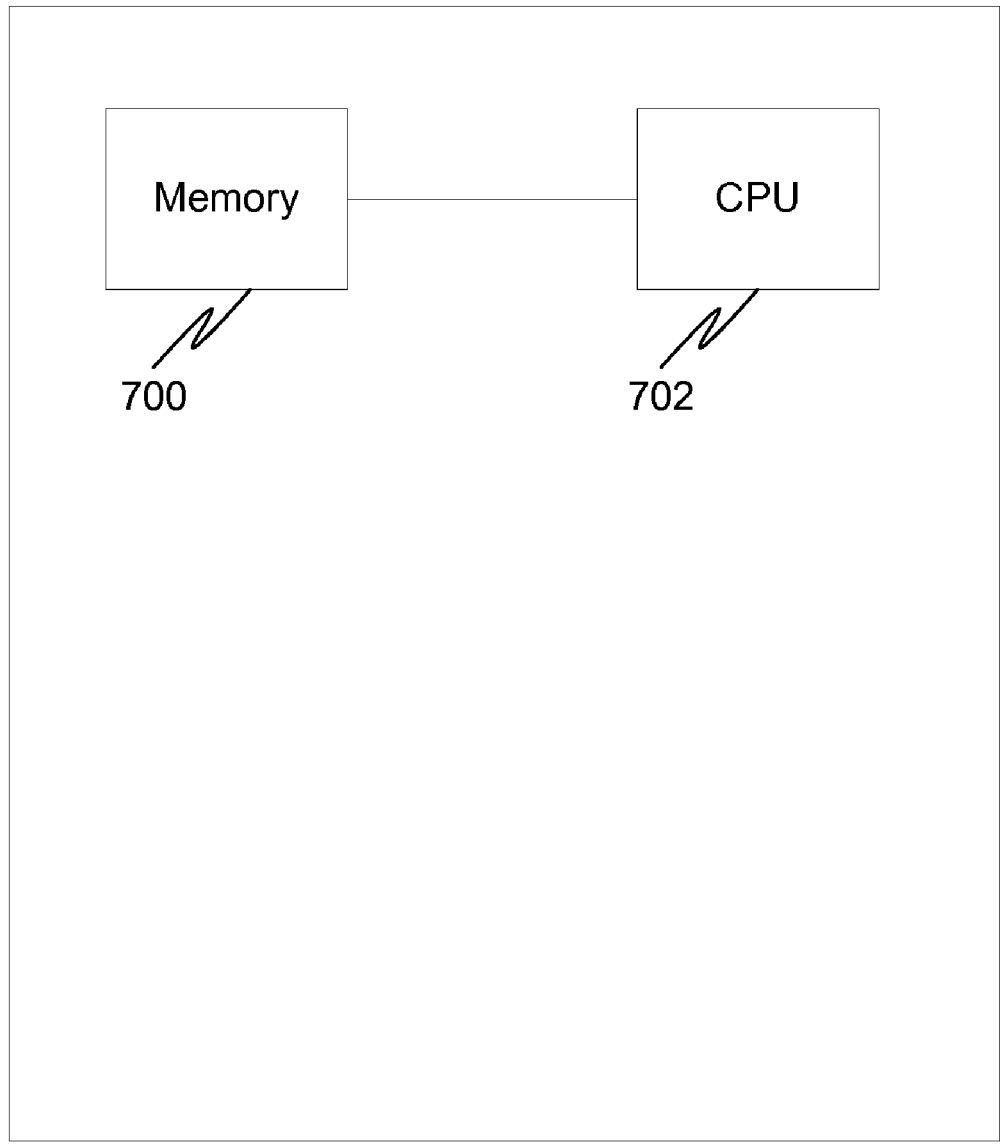
FIG. 7 is a flow diagram illustrating a control point in accordance with an embodiment of the present invention.

FIG. 7 is a flow diagram illustrating a control point in accordance with an embodiment of the present invention. The control point may be embodied on many different types of physical device, including servers, personal computers, laptops, cell phone, set-top-boxes, etc. The control point may have a memory 700 to store information related to the processes it performs. The memory may be volatile (e.g., random access memory (RAM)) or on-volatile (e.g., hard disk, flash memory, DVD, etc.). The control point may also have a processor 702 configured to perform the various steps of FIGS. 5 and/or 6, described above. The control point may be considered a general purpose computer which, when programmed with the steps of FIGS. 5 and/or 6, becomes a special purpose machine programmed to perform those steps.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method of establishing end-to-end Quality of Service (QoS) in a single end-to-end connection between a local device in a local network and a remote device in a remote network, the method comprising:

receiving total end-to-end QoS requirements for a connection between a local device in a local network and a remote device in a remote network;

requesting that a QoS connection for a segment of the connection between the local device and a local gateway in the local network be established, based on the total end-to-end QoS requirements;

computing remaining QoS requirements by deducting actual QoS assigned for the QoS connection for the segment of the connection between the local device and the local gateway from the total end-to-end QoS requirements;

requesting that a QoS connection for a segment of the connection between the remote device and a remote gateway in the remote network be established, using the remaining QoS requirements so that the QoS assigned for the QoS connection for the segment of the connection between the remote device and the remote gateway is based upon the actual QoS assigned for the QoS connection for the segment of the connection between the local device and the local gateway, and such that the QoS assigned for the QoS connection for the segment of the connection between the remote device and the remote gateway is different than actual QoS assigned for the QoS connection for the segment of the connection between the local device and the local gateway, and requesting to configure a QoS connection between the local gateway and the remote gateway.

2. The method of claim 1, wherein the requesting that a QoS connection for the segment of the connection between the remote device and the remote gateway in the remote network be established includes sending a request directly to a remote QoS manager.

3. The method of claim 1, wherein the requesting that a QoS connection for a segment of the connection between the remote device and the remote gateway in the remote network be established includes sending a request to the local gateway to forward to the remote gateway that a QoS connection between the remote device and a remote gateway be established in the remote network, wherein the request to the local gateway includes the remaining QoS requirements.

4. The method of claim 3, further comprising:

invoking an action on the local gateway to locate the remote network to which the remote device belongs.

5. The method of claim 1, wherein the configuring of a QoS connection for the segment of the connection between the local gateway and the remote gateway includes updating a pre-existing QoS connection between the local gateway and the remote gateway.

6. The method of claim 1, wherein the configuring of a QoS connection for the segment of the connection between the local gateway and the remote gateway includes establishing a new QoS connection for the segment of the connection between the local gateway and the remote gateway.

7. The method of claim 6, wherein the requesting to configure a QoS connection for the segment of the connection between the local gateway and the remote gateway also includes contacting a service provider for a network linking the local gateway and the remote gateway.

8. The method of claim 1, wherein the total end-to-end QoS requirements are contained in a traffic specification.

9. The method of claim 8, further comprising updating the traffic specification with the remaining QoS requirements after the computing.

10. The method of claim 1, wherein the total end-to-end QoS requirements are contained in a traffic descriptor.

11. The method of claim 1, wherein the requesting that a QoS connection for the segment of the connection between the remote device and the remote gateway in the remote network be established includes utilizing the Session Initiation Protocol (SIP).

12. The method of claim 1, wherein the requesting that a QoS connection for the segment of the connection between the remote device and the remote gateway in the remote network be established includes utilizing the Hypertext Transfer Protocol (HTTP).

13. The method of claim 1, wherein the local gateway and the remote gateway each operate a remote access server (RAS) service.

14. The method of claim 1, wherein the local and remote networks are Universal Plug and Play (UPnP) networks.

15. The method of claim 1, wherein the requesting steps are performed via UPnP QoS mechanisms.

16. A control point in a local network, the control point attempting to establish end-to-end QoS in a single end-to-end connection between a local device in a local network and a remote device in a remote network, comprising:
  memory; and
  a processor configured to:
    receive total end-to-end Quality of Service (QoS) requirements for a connection between a local device in a local network and a remote device in a remote network;
    request that a QoS connection for a segment of the connection between the local device and a local gateway in the local network be established, based on the total end-to-end QoS requirements;
    compute remaining QoS requirements by deducting actual QoS assigned for the QoS connection for the segment of the connection between the local device and the local gateway from the total end-to-end QoS requirements;
    request that a QoS connection between the remote device and a remote gateway in the remote network be established, using the remaining QoS requirements so that the QoS assigned for the QoS connection for the segment of the connection between the remote device and the remote gateway is based upon the actual QoS assigned for the QoS connection for the segment of the connection between the local device and the local gateway; and
    request to configure a QoS connection between the local gateway and the remote gateway.

17. A system for establishing end-to-end Quality of Service (QoS) in a single end-to-end connection between a local device in a local network and a remote device in a remote network, the system comprising:
  a first network comprising:
    a first device;
    a control point;
    a first QoS manager; and
    a first gateway, wherein the first gateway includes a remote access server (RAS) service;
  a second network comprising:
    a second device;
    a second QoS manager; and
    a second gateway, wherein the second gateway includes a remote access server (RAS) service;
  wherein the first device is configured to request a QoS connection between the first device and the second device, with total end-to-end QoS requirements;
  wherein the control point is configured to receive the request from the first device and to request that the first QoS manager establish a QoS connection for a segment of the connection between the first device and a first gateway;
  wherein the first QoS manager is configured to establish the QoS connection for the segment of the connection between the first device and the first gateway using the total end-to-end QoS requirements, and to send confirmation to the control point including actual QoS assigned for the QoS connection for the segment of the connection between the first device and the first gateway;
  wherein the control point is further configured to compute remaining QoS requirements by deducting achieved QoS from the total end-to-end QoS requirements and to send a request to the first gateway that a QoS connection for a segment of the connection between the second device and the second gateway be established, wherein the request to the first gateway includes the remaining QoS requirements;
  wherein the first gateway is configured to forward the request that a QoS connection for the segment of the connection between the second device and the second gateway be established to the second gateway;
  wherein the second gateway is configured to forward the request that a QoS connection for the segment of the connection between the second device and the second gateway be established to the second QoS manager;
  wherein the second QoS manager is configured to establish the QoS connection for the segment of the connection between the second device and the second gateway using the remaining QoS requirements, and to send confirmation to the control point;
  wherein the control point is further configured to receive the confirmation from the second QoS manager that a QoS connection between the second device and the second gateway and to send a request to the first gateway to configure a QoS connection for a segment of the connection between the first gateway and the second gateway; and
  wherein the first gateway is configured to request that a network service provider establish a QoS connection for the segment of the connection between the first gateway and the second gateway.

18. The system of claim 17, wherein the RAS on the first gateway exposes an interface to invoke a UPnP action to discover that the second device is located in the second network.

19. A non-transitory program storage device readable by a machine tangibly embodying a program of instructions executable by the machine to perform a method of establishing end-to-end Quality of Service (QoS) in a single end-to-end connection between a local device in a local network and a remote device in a remote network, the method comprising:

receiving total end-to-end QoS requirements for a connection between a local device in a local network and a remote device in a remote network;

requesting that a QoS connection for a segment of the connection between the local device and a local gateway in the local network be established, based on the total end-to-end QoS requirements;

computing remaining QoS requirements by deducting actual QoS assigned for the QoS connection for the segment of the connection between the local device and the local gateway from the total end-to-end QoS requirements;

requesting that a QoS connection between the remote device and a remote gateway in the remote network be established, using the remaining QoS requirements so that the QoS assigned for the QoS connection for the segment of the connection between the remote device and the remote gateway is based upon the actual QoS assigned for the QoS connection for the segment of the connection between the local device and the local gateway; and requesting to configure a QoS connection between the local gateway and the remote gateway.

* * * * *